United States Patent [19]

Valliant et al.

[11] Patent Number: 5,608,527

[45] Date of Patent: Mar. 4, 1997

[54] APPARATUS AND METHOD FOR DYNAMIC MEASUREMENT OF SURFACE ROUGHNESS

[75] Inventors: James G. Valliant, Bozeman, Mont.; David G. Goebel, El Cajon, Calif.

[73] Assignee: Optical Dimensions, LLC, Bozeman, Mont.

[21] Appl. No.: 400,656

[22] Filed: Mar. 8, 1995

[51] Int. Cl.$^6$ .................................................. G01B 11/30
[52] U.S. Cl. .......................... 356/371; 356/371; 356/73; 356/237; 356/445
[58] Field of Search .................................. 356/446, 445, 356/447, 448, 371, 237, 73

[56] References Cited

U.S. PATENT DOCUMENTS

| | | | |
|---|---|---|---|
| 4,334,780 | 6/1982 | Pernick | 356/359 |
| 4,364,663 | 12/1982 | Gardner et al. | 356/371 |
| 4,803,374 | 2/1989 | Monfort et al. | 250/571 |
| 4,950,905 | 2/1989 | Butler et al. | 250/358.1 |
| 4,973,164 | 11/1990 | Weber et al. | 356/371 |
| 4,991,971 | 2/1991 | Geary et al. | 356/446 |
| 5,119,132 | 6/1992 | Butler | 355/208 |
| 5,162,660 | 11/1992 | Popil | 250/561 |
| 5,164,790 | 11/1992 | McNeil et al. | 356/355 |
| 5,189,490 | 2/1993 | Shetty et al. | 356/371 |
| 5,196,906 | 3/1993 | Stover et al. | 356/446 |
| 5,205,900 | 4/1993 | Inoue et al. | 156/691 |
| 5,241,369 | 8/1993 | McNeil et al. | 356/445 |
| 5,313,542 | 5/1994 | Castonguay | 385/115 |

*Primary Examiner*—Frank Gonzalez
*Assistant Examiner*—Reginald A. Ratliff
*Attorney, Agent, or Firm*—Baker, Maxham, Jester & Meador

[57] ABSTRACT

An apparatus for non-contact measuring of surface roughness, comprises a source of light positioned for directing a light beam at a first angle onto a surface to be measured, a segmented multi-element array detector positioned to receive specular light reflected from the surface by an intermediate segment and to receive scattered light very close to the specular light by adjacent segments, the intermediate segment responsive to generate a signal in response to the specular light, and the adjacent segments each responsive to generate a signal in response to the scattered light, a second detector spaced from the first detector and at an angle less than that of the first angle, the second detector responsive to scattered light away from the specular light for generating a signal responsive to the scattered light, and a processor for receiving and processing the signals and displaying a reading corresponding to surface roughness.

32 Claims, 17 Drawing Sheets

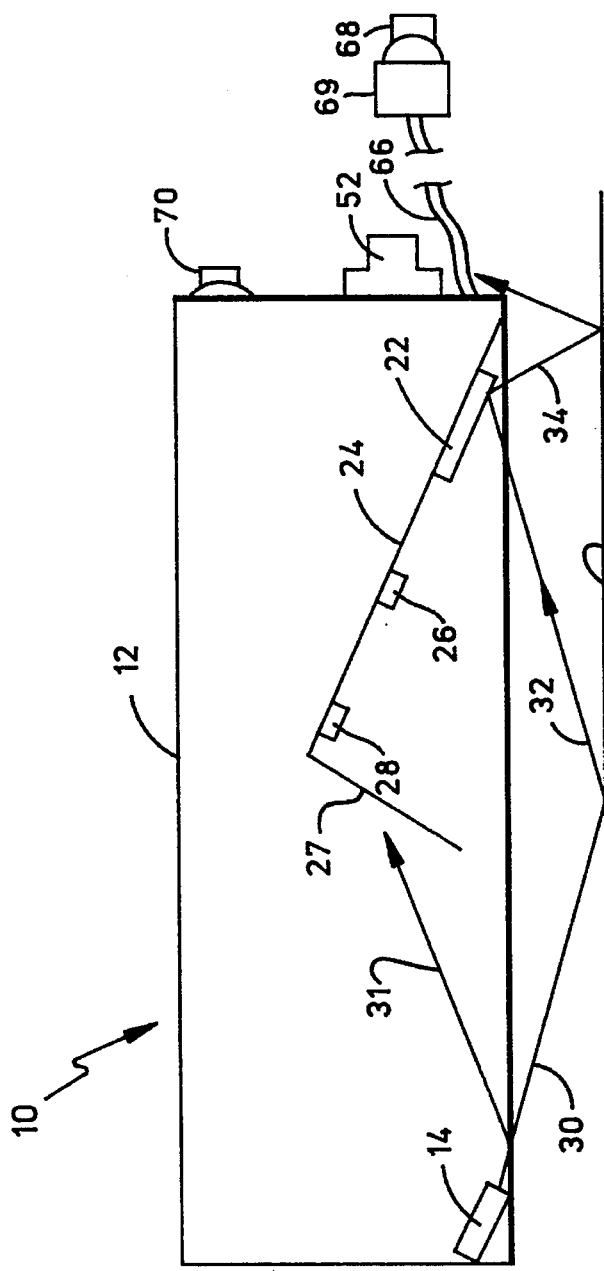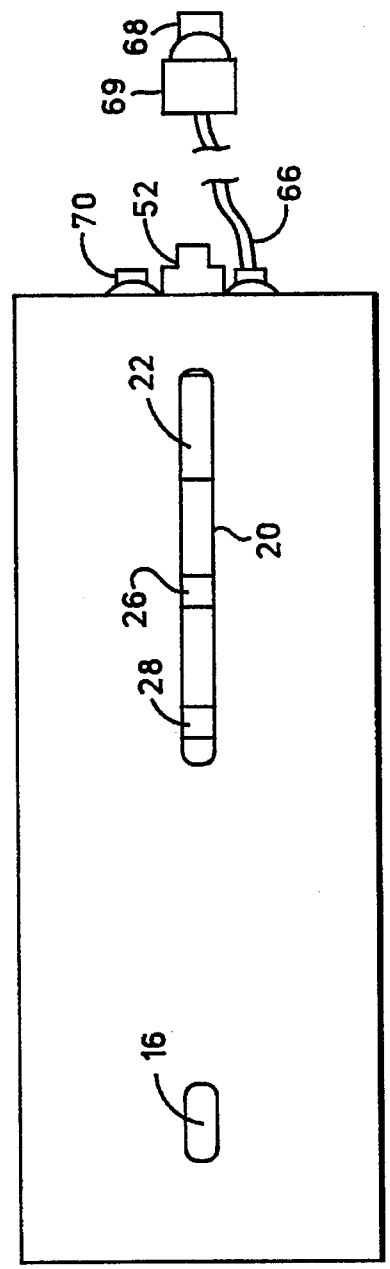
FIG. 1
FIG. 2

Standoff = ((0.5 × laser to array detector distance) × tangent (illumination angle WRT Surface)) − ((specular detector # × distance between detector elements) × sine (detector array angle WRT Surface))

For Lasercheck current design laser to array distance = 9.0"
illumination angle WRT Surface = 15°
distance between detector elements = 1 mm or 1/25.4 inches
array angle WRT Surface = 20°

∴ Standoff = ((0.5 × 9.0) × tan 15°) − (specular detector # × 1/25.4 × sin 20)

*FIG. 17*

APPARATUS AND METHOD FOR DYNAMIC MEASUREMENT OF SURFACE ROUGHNESS

BACKGROUND OF THE INVENTION

1. Field of the Invention

The present invention relates generally to the measurement of surface roughness and pertains particularly to an instrument for non-contact in process surface roughness measurement.

2. Discussion of Prior Art

Surface smoothness is an important consideration in the manufacture of many products. The manufacturing of sheet metal is one industry where surface smoothness must be maintained at a high standard. Sheet metal, such as sheet steel and aluminum are manufactured by squeezing the metal between opposed high-pressure rollers and frequently at high temperatures. The high-pressure rollers become rough in the process of forming the sheet metal, thereby transferring their roughness to the sheet metal. The rollers must be removed from the machinery and resurfaced by regrinding to a smooth surface to continue the rolling operation. Rollers for the aluminum industry are typically removed and resurfaced on a daily basis. Rollers for sheet steel deteriorate rapidly and are typically removed and resurfaced in a matter of a few hours.

The process of checking the smoothness of the rollers and the sheet metal during the process is critical to the manufacturing process. The conventional approach to surface smoothness monitoring is by the use of a mechanical stylus profilometer. In order to check for surface smoothness the production line must be stopped. The parts to be tested are moved to a laboratory for the testing to take place, or a small portable profilometer is mounted on the static part to perform a measurement. This disrupts the production line and is time consuming.

A stylus profilometer utilizes a fine stylus tip, usually a few microns in width, which is brought into contact with the surface and is dragged across the surface for a distance of typically one to two mm. As it is dragged across the surface, the stylus moves up and down as it encounters scratches, pits, and general roughness on the surface. This vertical motion is carefully monitored and recorded and then used to calculate surface roughness. The motion is similar to a phonograph needle, except on a finer scale.

A number of drawbacks to these instruments and their use is lack of sensitivity, accuracy, and repeatability, particularly on higher quality surfaces. They are very sensitive to vibrations and often leave visible scratches on surfaces that they measure, either damaging the part or, at the very least, leaving one to wonder what they are really measuring. This measuring process is very slow and covers an exceptionally small surface area on a surface. This makes high volume, in-process and large area testing virtually impossible.

Attempts to overcome the drawbacks of these instruments were proposed in the 1970's by the introduction of optical profilometers. These were used primarily in the precision military and aerospace optics industry. Stylus profilometers were incapable of measuring state of the art surfaces achievable by these users. Optical profilometers are leading edge, complex and difficult to operate. Several different versions of these systems have been developed and are presently in use.

These instruments involve the coupling of a laser interferometer to a precision optical microscope, wherein a laser beam enters the microscope and then is split in half inside the microscope. Half of the beam is focused by the microscope onto a sample to be measured and the other half is focused onto a known reference surface. The laser beam bounces off these two surfaces inside the microscope. Optical interference patterns are created by the surface finish on the test piece and are measured by the instrument using this information to calculate surface roughness. These instruments also have a number of drawbacks, including extremely high cost, too slow for manufacturing quality control or process control application, and require flat surfaces to measure. In addition, they can only operate in a controlled laboratory or a highly controlled and clean manufacturing environment.

Atomic force microscopes (AFM's) and scanning tunneling microscopes (STM's) are high technology surface roughness measuring tools which were introduced in the 1980's. Their principle of operation involves an absolute in precision mechanical device motion control and vibration isolation. An ultra-fine stylus tip like a phonograph needle, only a few molecules in diameter, is brought to within atomic distance from a surface and an atomic tunneling current is created between the molecules in the stylus tip and the surface to be measured (the surface must be electrically conductive). The instrument then precisely maintains the atomic force and motions the stylus a few microns (1/100th the width of a human hair) across the surface. Roughness, defects, or scratches cause the stylus to move up and down during the scan in order to maintain the "atomic force". The up and down motion is monitored and measured very precisely and this information used to determine roughness or finish over the measured area. The instrument is enormously sensitive and can resolve individual molecules and atoms under favorable conditions. The major drawbacks of this approach are that the instruments can only be used in laboratory environments due to their extreme sensitivity to vibration and harsh environments, and they are extremely expensive.

Attempts have also been made in recent years to develop an optical non-contact sensor of surface roughness which involved the principal of illuminating a surface with either an incoherent or coherent laser source and monitoring the specular light being reflected off the surface. As the surface roughness changes, the relative intensity, polarization, or direction of the specular light changes. Examples of these attempts are disclosed in U.S. Pat. Nos. 5,162,660 issued to Popil; 4,511,800 and 4,803,374 issued to Monfort et al; and 4,973,164 issued to Weber et al.

Attempts to measure and evaluate overall integrated scatter intensity are disclosed, for example, in U.S. Pat. Nos. 4,360,275 issued to Louderback, and 4,972,092 issued to Schmitt et al. Attempts to integrate the overall intensity and angular distribution of light reflected and scattered from the surface for analysis is addressed in U.S. Pat. Nos. 5,164,790 to McNeil et al and 4,334,780 to Pernick.

These represent an attempt to design instruments to quantify scatter for analysis and use in aerospace and astronomical optical system designs. Most of these earlier laboratory models were designed for small samples to be mounted in a holder with some laser source illuminating this sample and detector on a motorized stage scanning in an arc around the sample to record the scatter angle and intensity information. A mathematical technique known as fourier transform analysis converts the density of laser scatter at specific angles to the roughness value of the measured surface. The instruments have been complex R&D machines with selling prices above $100,000.00. Few of these instruments are in use and are typically considered solely as instruments for measuring scattered light from very smooth optical surfaces. The measurement of very smooth optical surfaces with scatter and conversion of these scatter signals to roughness values is fairly well understood and the technique has evolved as a complimentary and competitive technique to optical profilometry.

Attempts to adapt this technology to high volume surface measurement for general manufacturing has not been successful. The attempts have been made involving some form of laser illumination with one or more discrete detectors positioned at various scatter angles to sample a portion of the scatter field. Attempts to convert these limited measurements to surface roughness values involve making assumptions about the rest of the scatter patterns that these systems do not measure. These assumptions are often substantially incorrect, resulting in significant inaccuracies in the roughness determination.

Another drawback to most of the prior instruments is that the sensors are positioned so that the receiving phase is normal to the reflected rays from the measured surface. This results in any light not being absorbed by the receiver being reflected back to the measured surface, and reflected again and re-received. In order to solve this problem, these instruments have had elaborate and expensive black, beam folding and beam absorbing traps or dumps built into the detection system.

Accordingly, there is an evident need for an instrument that has the capability of reasonably accurate, rapid, non-contact, non-destructive, in-process measurement of surfaces as they are being created.

SUMMARY OF THE INVENTION

It is the primary object of the present invention to provide an improved non-contact instrument for dynamic in-process measurement of the roughness of surfaces.

In accordance with a primary aspect of the present invention, a surface roughness measuring apparatus for non-contact measuring of the roughness of a surface comprises a source of light positioned for directing a light beam at a first angle on a surface to be measured, a multi-element array detector positioned to receive a specular light beam from said surface, said detector positioned at an angle to the axis of said reflected light to direct non-absorbed light from said detector away from said surface, a second detector spaced from said first detector and at a greater angle to said surface than said first angle, and means responsive to light detected by said first and said second detectors for initiating a display indicative of the roughness of the surface.

In another aspect of the invention, a method for non-contact measuring of surface roughness comprises directing a light beam from a source of light at a first angle onto a surface to be measured, receiving specular light of said beam at first detector means including a segmented multi-element array detector positioned to receive specular light reflected light from said surface by an intermediate segment and to receive scattered light by adjacent segments, said intermediate segment responsive to generate a signal in response to said specular light, and said adjacent segments each responsive to generate a signal in response to said scattered light, receiving scattered light by second detector means including a detector spaced from said specular beam at an angle of about thirty-five degrees, said detector responsive to scattered light away from said specular light for generating a signal responsive to said scattered light, and processing said signals and displaying a reading corresponding to surface roughness.

BRIEF DESCRIPTION OF THE PREFERRED EMBODIMENTS

The above and other objects and advantages of the present invention will become apparent from the following description when read in conjunction with the accompanying drawings wherein:

FIG. 1 is a side elevation view diagrammatically illustrating the hardware of the subject invention;

FIG. 2 is a view from underneath the embodiment of FIG. 1;

FIG. 17 is a flow diagram illustrating the calculations for determining the standoff distance with respect to the surface.

DETAILED DESCRIPTION OF THE PREFERRED EMBODIMENTS

Figure 3:
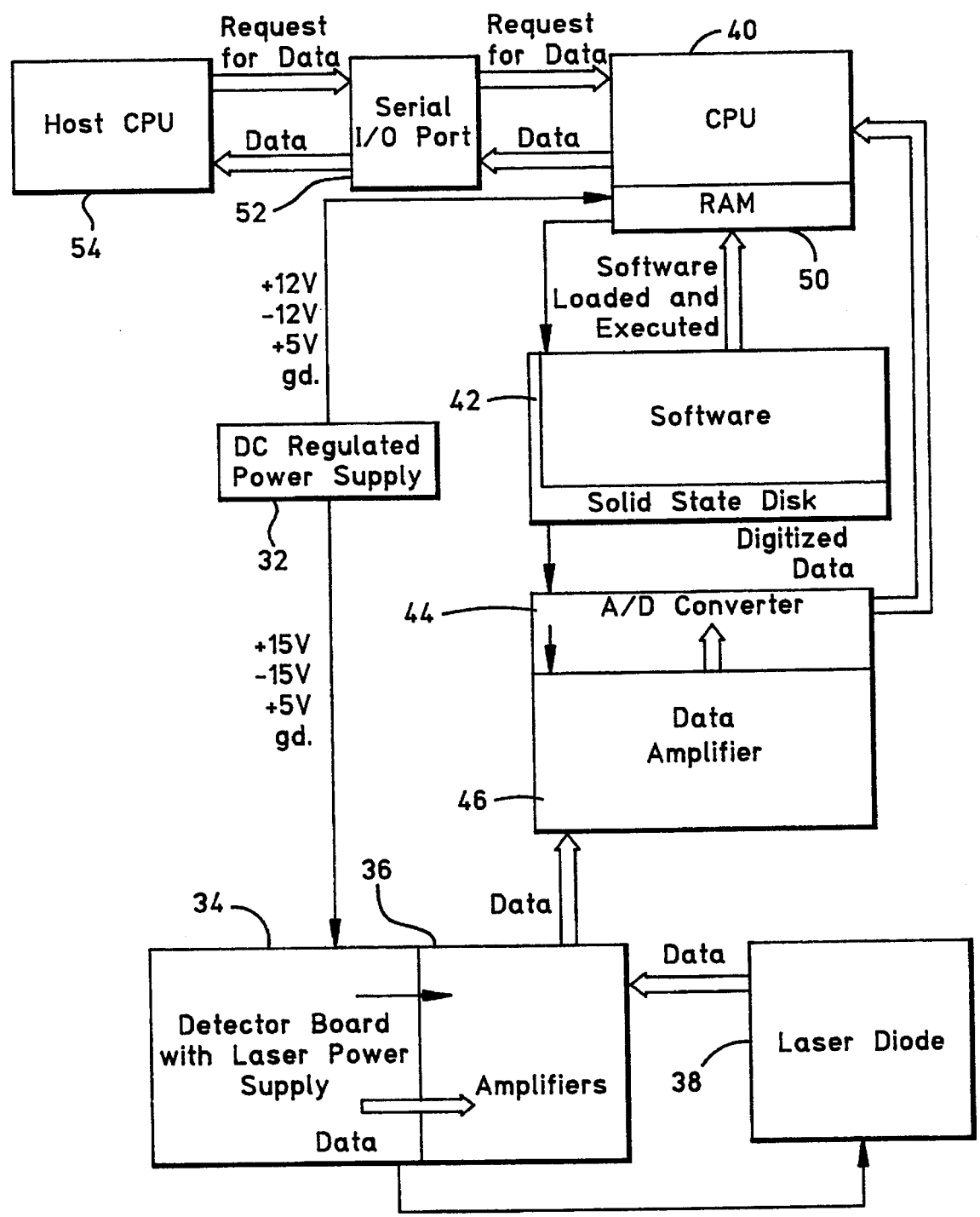
FIG. 3 is a schematic block diagram illustrating applicant's operating system.

Referring to FIGS. 1 and 2 of the drawings, a surface roughness measuring instrument, in accordance with the invention, is illustrated and designated generally by the numeral 10. The measuring instrument comprises a generally box-like housing 12 in which is mounted a source of light such as a laser 14 positioned to direct light through an opening or window 16 in the lower surface of the housing 12 and onto a surface 18 to be measured. Reflection and scatter 31 from the window 16 are blocked by a baffle 27 and prevented from striking the detectors and interfering with the measurement results. The light beam reflected from the surface 18 is directed through a slot or window 20 in the lower surface of the housing 12 and onto a photo detector array 22 mounted within the housing on a suitable support such as a PC board 24. Additional detectors 26 and 28 are positioned at spaced distances from the detector array 22 for detecting certain scarer rays at larger angles away from the specular beam. The detector 26 is preferably at an angle of about 35° from specular center and detector 28 is preferably about 65° from specular center.

The instrument may be mounted on a suitable carriage above a production line of sheet metal or other material so that it can traverse articles produced and obtain a measurement across the entire width of the sheets as production continues. It may also be positioned above the rollers of a mill to measure the surface of the roller as production continues. It eliminates the need to stop the production line to measure surface smoothness of either the articles produced or the rollers forming the surface of the articles. It can be mounted above or adjacent a roller as the roller is being surfaced. This also eliminates the need to stop the resurfacing process on the rollers to check roughness.

In the illustrated embodiment the laser 14 directs a coherent radiation at or near the visible spectrum such as light beam 30 onto the surface 18 at a high incident angle with the specular beam 32 being reflected from surface 18 and striking the array 22. The array 22 is positioned at an angle such that specular reflection or rays not absorbed by the array 22 are reflected along beam 34 away from the inspected area of the surface 18. This positioning at the angle to direct reflected light away from the surface being inspected eliminates multiple reflections that effect the reading and eliminates the need for elaborate and expensive black, beam folding and beam absorbing traps and dumps built into the detector system. The preferred angle of incidence of the light ray 30 is about 75° (from normal) and the angle of reflection, of course, will be the same.

The array 22 is preferably an in line array containing about 35 distinct elements and is positioned such that the specular ray falls within the first eleven away from the point of reflection. If the specular center is the eleventh or greater, the surface is too close to the head to give a good roughness number. The system is programmed to send an error message if this occurs. The scatter rays from about 0.5° to 5° of the specular ray provide important information as to the roughness. Scattered rays are picked up by detectors 12–35 outward from the specular center.

The system always determines which element is receiving specular. It then always starts calculating and using scarer starting from the 2nd element away from specular to the 25th element away from specular. For example, assume Case 1 where specular strikes No. 3 and Case 2 where specular strikes No. 10. In Case 1, the 2nd element would be No. 5 and the 25th would be No. 28. In Case 2, the 2nd element would be No. 12 and the 25th would be No. 35. In both cases, scatter close to specular is used. In both cases, all angles relative to specular are identical and the number of scatter elements used in the calculation of roughness are identical—nothing changes in terms of the overall measurement and expected accuracy. In each measurement, a group of detectors are simply ignored and not used. If specular hits detector No. 11, the 25th array element from it would be 36. There are only 35 in the array, therefore No. 11 can't work and is invalid. This makes being too close invalid.

Referring to FIG. 3, a block diagram of the overall system of the present invention is schematically illustrated. A remote DC regulated power supply 32 converts 110 Volts AC voltage to regulated DC voltage to the instrument electronics through a 10 wire conductor cable connecting the units. The DC regulated power supply box preferably contains two separate computer grade power supplies. One powers the detector board 34 containing amplifiers 36 and laser diode source 38 with ±15 Volts, +5 Volts, and ground. The other powers the CPU board 40 which is preferably ½ size format 386 CPU board with 387 co-processor such as the Arise Computers ASC 386 series. The second power supply also powers the solid state disk board 42, and the analog to digital (A/D) converter 44 and amplifier board 46 with ±12 Volts, +5 Volts, and ground.

The use of separate power supplies minimizes noise between electronic components, however, a single power supply delivering all of the appropriate voltages could be used and would be acceptable. The detector board 34 provides the necessary ±15 Volts and ground to the detector amplifiers 36. A current limiting and pulsing power supply is provided on the detector board to deliver the +5 Volt power and ground to the laser source 38. The CPU board 40 is directly powered by the ±12 Volt, +5 Volts, and ground. The solid state disk board 42 and A/D board 44 are directly connected to the CPU board 40 and receive the ±12 Volt, +5 Volts, and ground via PC104 format connectors. Other physical combinations of these boards could be implemented. For example, Flash and/or ROM memory devices plus the A/D converter could be an integral part of the CPU board.

Referring to FIGS. 1 and 2, as the laser diode 14 pulses, the diode array detector 22, the single element detectors 26 and 28, and the laser diode monitor detector (internal to the laser diode module) generate current signals proportional to the level of light signal striking them. The laser diode in an exemplary embodiment is a 670 nm Toshiba TOLD9211 series mounted in a small TO style header with collimating optics in front of it. The laser is powered to provide a combination of average and peak power outputs to result in a Class II rating by the Center for Devices and Radiological Health (CDRH). Several other lasers could be selected to provide equivalent or even better performance but may result in a higher and more restrictive CDRH rating.

The diode array is a 35 element linear array mounted in a 40 pin DIP package such as the United Detector Technology (UDT) A5V-35 series which is directly mounted on the board. Several other sizes of arrays or tightly spaced single element detectors may be used to simulate the function of the array in different geometries and configurations of the design. The single element detectors are Siemens BPW34 series detectors. A wide variety of equivalent commercially available detectors can be utilized with similar results.

Referring to FIG. 3, the signals from the detectors are fed through a network of quadrant amplifiers 36 mounted directly on the detector board 34 and in close proximity to the detectors to minimize noise pickup on electrical traces prior to amplification. The amplifiers 36 convert the current signal to a voltage signal by an on board resistor network in close proximity to the amplifiers. The signal is then sent to a forty pin header on the board and transferred to the A/D board 44, 46 by a forty pin ribbon cable.

The A/D board 44, 46 is a fourteen bit board such as the Diamond Systems SMM-14 series which provides high accuracy and resolution to the digitized values. It is an eight channel board and three of the channels are reserved to monitor laser current, voltage, and optical power. The remaining five channels are sequentially scanned eight times to obtain the thirty-seven detector channels of information. An A/D board containing lower accuracy (12, 10, 8 bit etc.) or a board with fewer or greater channels could be substituted and achieve similar results with slightly degraded accuracy or resolution. The board contains computer programmable amplifiers 46 that can be set to amplify the signal 1X, 2X, 4X, 8X. Software of the system determines optimal gain setting for each detector signal then sets the gain on the A/D board amplifier 46. The "twice" amplified signals are then digitized by the A/D converter 44 on the A/D board. Digitized signals are then provided directly to the CPU board 40 through the PC104 format connectors.

The solid state disk 42, such as the Arise Computers Inc. A104-SSD, contains 256K of flash memory 48 to store the head measurement and control software in the same way software is stored on a computer's hard disk. An "autoexec.bat" file is included with the software which loads and executes the software on 512K of RAM 50 resident on the board 40 through the PC104 format pins when power is applied to the system. Other formats of memory devices and physical/electrical connections could be used to successfully store and execute the program.

The CPU board 40 begins executing the program when power is applied to the system. It is suitably programmed to convert the digitized data being provided from the A/D board 44, 46 into roughness and alignment data and provides the data to the serial I/O port 52. Different processors could be used to run the software. A math co-processor chip is used to increase system speed as the software is a mathematics intensive program converting the multiple detector signals into alignment and roughness values. Faster processing allows the system to read detector signal values faster resulting in more data being recorded during a laser on pulse. This results in higher accuracy and stability from the system. Conversely, use of a slower processor will result in lower accuracy and stability from the system. Given the power of the laser, selection of amplifiers, and range of surfaces the system is designed to measure, a 386 processor with 387 co-processor is preferred and provides good accuracy and stability.

The host computer 54 contains operating system software such as that sold under the Trademark WINDOWS by Microsoft, under which the system user display and control software operates. When the user executes the software and initiates the "run" module, the software requests data (alignment, roughness or raw data) from the serial port of the computer which is connected to the serial port 52 of the measurement head by a mull modem serial cable. If data is present at the serial port (the system is powered and running), the software reads the data and displays it to the user in a WINDOWS format screen. If data is not present at the serial port, an error message is provided to the user in a WINDOWS format screen.

The light source 14 can be any suitable collimated light source and preferably a low power (eye safe) visible wave length laser diode. It may be an ultra-violet (UV), or infra-red (IR) laser source or a light emitting diode (LED) source of ultra-violet, visible, or infra-red wave length. The power supply preferably operates in a pulsed-mode of operation to allow background noise subtraction by software. The light source preferably includes beam conditioning and steering optics to more accurately direct the illumination source to the surface being measured and produce a fine focus at the detector plane.

The detection system is oriented so that reflected light does not strike the detectors at angles normal to the detector plane, but at angles designed so that reflected and scattered light striking the detectors and that is not absorbed is reflected away, as previously explained.

The segmented multi-element array detector 22 is an in line array to measure light reflected and scattered in the direction of the specular center of the focused reflected beam and at angles very close to that specular center. The segmented multi-element array is preferred to other forms of detectors (such as, charge coupled device [CCD] and charge injection device [CID] arrays) which are commonly used in imaging systems due to a combination of characteristics. Among these characteristics are low electrical crosstalk between adjacent detector elements (less than 0.1% for some wavelengths) and the ability to measure large dynamic ranges of light intensity in the reflected and scattered light distribution with a single measurement. A linear change in light intensity incident on the detector causes a linear change in current from the detector over a wide dynamic range of greater than seven orders of magnitude for some detectors. Spacing between edges of adjacent detector elements is preferably less than 0.005 inches.

The segmented and the single detectors are preferably silicon based detectors to be compatible with the preferred visible laser diode of the system. They may also be germanium, indium antinomide, mercury cadmium telluride, mercury manganese telluride, lead sulfide, lead selenide, or other common solid state detector materials for extending the operation range of the invention to operate in the UV, visible, and IR regions of the spectrum. The system is designed to measure surface roughness from less than 0.1% of wave length utilized (less than 5 Å Ra for UV wave length) to greater than 1 X the wave length utilized (greater than 100 µinches, Ra for IR wave length). Higher gain detection devices, such as avalanche photo diodes (APDS) and photomultiplier tubes (PMTS) may also be utilized in the invention to improve performance measuring lower signal levels from smoother surfaces. Additional wave lengths may be used to measure wider ranges of surface roughness.

Figure 4:
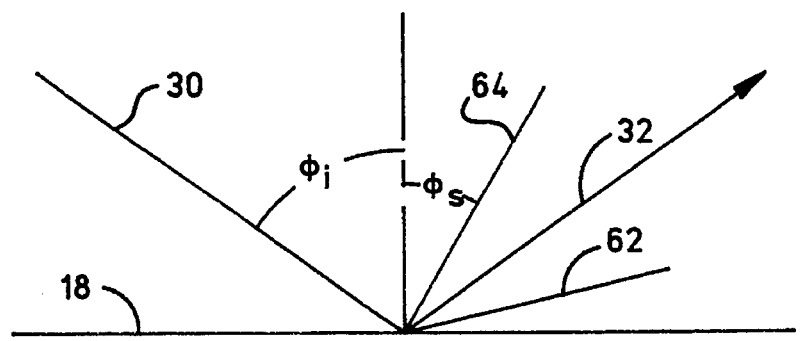
FIG. 4 is a side elevation view schematically illustrating the specular reflection and scattering of a light beam from a surface.

Referring to FIG. 4 of the drawings, a diagrammatic illustration of the reflection and scatter of the beam 30 is illustrated. The beam 30 is directed onto and strikes the surface 18 at an incident angle $\theta_i$. The specular beam 32 is reflected at an angle equal to the incident angle. Roughness on the surface 18 causes some of the light to scatter (diffusely reflect, diffract) in directions other than the specular 32. This results in scatter light beams 62 and 64. Each angle of scatter is caused by roughness of a different width, (different frequencies). Surface roughness will result in scattering of beams or rays of light 62 at a scatter angle of $\theta_{S1}$ and beams or rays at 64 at $\theta_{S2}$. This scatter phenomena is well-known and is derived by what is known as the "grating equation":

$$\text{Sin } \theta_S = \text{Sin } \theta_i - f\lambda$$

Where:

Sin $\theta_s$=sine of the scatter angle (relative to the surface normal)

Sin $\theta_i$=Sine of the incident angle (relative to the surface normal)

$\lambda$=wavelength of the laser light f=the frequency of the roughness scattering light If we know $\theta_S$, $\theta_i$, and $\lambda$, then we can solve for f. In a scatter measurement, $\theta_i$ is held constant, and $\lambda$ is held constant. As $\theta_S$ is varied, f (frequency) is varied. In other words, by measuring the different scatter angles, we are measuring different surface frequencies (widths of roughness features).

Surface roughness is 2 dimensional, having both width and height. We have discussed how to measure width with scatter, now we will discuss measuring height with scatter. Simply put, the more height (amplitude) of roughness, the more intense the scatter is. Specifically:

Scatter intensity $\alpha$ (Roughness amplitude)$^2$; and

The more intense the scatter, the more the height or amplitude of roughness. Scatter intensity is proportional to roughness amplitude squared.

If we measure scatter intensity and take the square root of that value, we get a number directly related to roughness amplitude. If we measure scatter angle we can determine roughness frequency. We can therefore transform scatter intensity vs. scatter angle to get roughness amplitude squared vs. roughness frequency. Integrating the roughness amplitude squared vs. surface frequency curve and taking square root of that yields what is known as "RMS" or root mean squared roughness.

This technique has been shown to work very well in the measurement of smooth precision surfaces. If the surface RMS roughness is greater than 1/6 of the wave length of laser light used, the technique has been shown to have difficulty providing a reliable answer.

The present invention is designed primarily for use in the metal working industry, although it may be used in other industries. Application in this industry typically involves roughnesses from five to forty μinches, which is rougher than 1/6 of the wave length of visible light. High illumination angles help extend possible roughness that can be measured. The present invention preferably utilizes an incident angle of about 75°, although it is not limited to that angle.

The standards in this industry require measuring low frequency or "wide" roughness features. These features have long wave cut-off specified in national and international standards such as ANSI/ASME B46.1 - 1985 at 0.25, 0.8 and 2.5 mm. The most common of these three is the 0.8 mm standard. Features of this roughness width scatter light very close to the specular (less than 1.0° from specular). The following chart shows the angles that must be measured to obtain roughness amplitude for a variety of different roughness frequencies given the use of a diode laser of 6,700 Å laser with a 75° incident angle.

nounced with high incident angles. The scatter angles must be determined relative to the specular beam at each instance of measurement.

Figure 5:
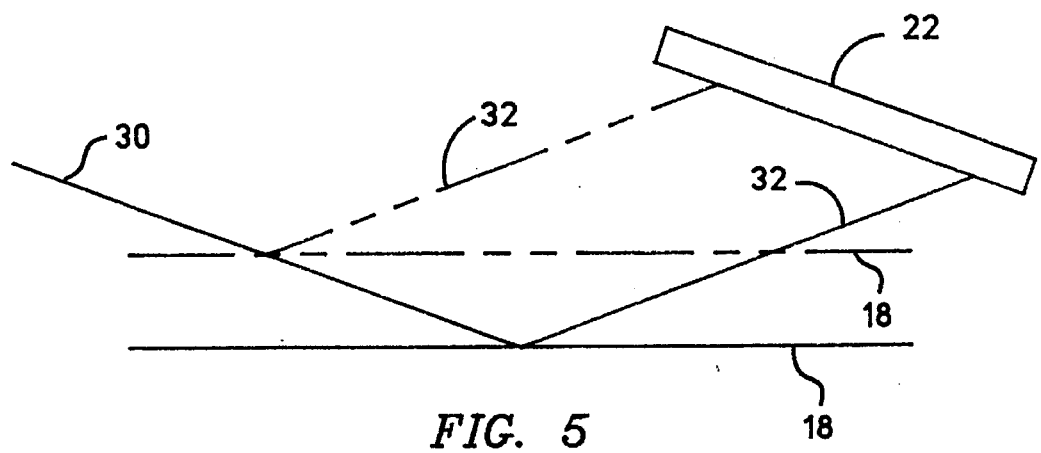
FIG. 5 is a side elevation view illustrating relative movement between a reflecting surface and a detector array.

As shown in FIG. 5, the specular beam will move along the array as the reflecting surfaces move toward and away from the measuring unit as a result of vibration. The system CPU is programmed to correct for these movements and to correct the distribution of all scatter angles that are measured at any instant.

The system is preferably programmed to take readings ten times each second. Thus, it will correct for dislocation of the specular beam, measure the scatter rays around the specular beam and at the far angle single detectors 26 and 28 and correct the respective angles and distances, etc.

The apparatus in the illustrated embodiment is contained within a housing having a length of about twelve inches with width and height of about five and one half inches. The unit is provided with connection to an external power supply 69 containing an on/off switch 68 such as by a cable or other suitable connection 66 and a switch 70 (FIG. 1) for the laser power. A serial in/out port 52 (FIG. 2) is provided for connection to an external host computer operating with microsoft WINDOWS software.

In operation, the unit is mounted on a suitable gantry or other suitable support structure above either a production line or a roller resurfacing machine. The unit is preferably mounted at a standoff of about 1.0 inches to ±0.1 inches. If preferably includes means for vertical adjustment toward and away from the work surface. The device is also preferably mounted to rotate about an axis normal to the work surface to provide proper alignment with the work surface. The device can measure flat to concave surfaces with radius greater than one inch.

Figures 6, 7:
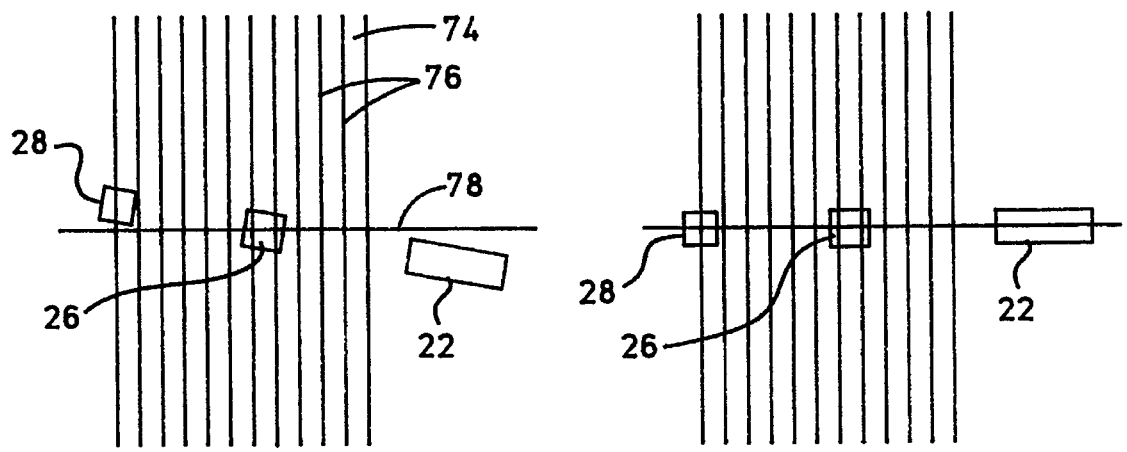
FIGS. 6 and 7 are top plan views illustrating alignment of the apparatus.

Referring to FIGS. 6 and 7, a non-aligned and aligned arrangement is illustrated, respectively. As illustrated in FIG. 6, an article 74 whose roughness is to be measured

| LASER WAVELENGTH (microns) | INCIDENT ANGLE (from surface) | SCATTER ANGLE (from surface) | SCATTER ANGLE (from specular) | SURFACE FREQUENCY (cycles/mm) | SURFACE WAVELENGTH (millimeters) |
|---|---|---|---|---|---|
| 0.6700 | 75.0000 | 74.9408 | 0.0592 | 0.4000 | 2.5000 |
| 0.6700 | 75.0000 | 74.8524 | 0.1476 | 1.0000 | 1.0000 |
| 0.6700 | 75.0000 | 74.8157 | 0.1843 | 1.2500 | 0.8000 |
| 0.6700 | 75.0000 | 74.7548 | 0.2452 | 1.6667 | 0.6000 |
| 0.6700 | 75.0000 | 74.4177 | 0.5823 | 4.0000 | 0.2500 |
| 0.6700 | 75.0000 | 74.2755 | 0.7245 | 5.0000 | 0.2000 |
| 0.6700 | 75.0000 | 73.5821 | 1.4179 | 10.0000 | 0.1000 |
| 0.6700 | 75.0000 | 68.8162 | 6.1838 | 50.0000 | 0.0200 |
| 0.6700 | 75.0000 | 64.0172 | 10.9828 | 100.0000 | 0.0100 |
| 0.6700 | 75.0000 | 39.1185 | 35.8815 | 500.0000 | 0.0020 |
| 0.6700 | 75.0000 | 17.2131 | 57.7869 | 1000.0000 | 0.0010 |

NOTE:
The systems first scatter detector measure 0.25 degrees from specular.
This corresponds to Surface Wavelength (long wavelength cutoff) of roughly 0.6 millimeters.

The segmented array detector 22 serves several critical functions in the invention. One important and significant function is the detection and location of the specular reflection. Preferably the detector array is positioned such that the specular reflection falls approximately on the sixth segment. The present invention is designed to be utilized on-line, such as on the measurement of sheet metal emerging from a rolling mill or rollers in the process of being surfaced. For this reason, the system is designed to accommodate small motions between the surface and the measurement head which will cause the specular beam to move relative to the detection system. This movement becomes more proshows a surface structure wherein the dominant lay or direction of roughness is transverse to a series of lines 76 running longitudinally on the part. The measuring instrument 10 is mounted above this surface and, as illustrated, is slightly out of alignment with the dominant direction of the roughness surface of the article. When the light beam from the laser is directed to the surface, a scatter pattern from the surface has a dominant direction which is illustrated by a strong band of light 78, perpendicular to that lay. As will be apparent from the illustrations, the measured scatter in FIG. 6 will be low-light intensity resulting from the misalignment of the individual detectors 26 and 28 which will have a low intensity and thus a misalignment. Rotation of the unit to the aligned position FIG. 7 will result in the detector's being positioned in the band of scatter and thereby reading a high intensity. The system measures these and monitors for intensity of the scatter at these detectors to insure perfect alignment as illustrated in FIG. 7.

Figure 8A:
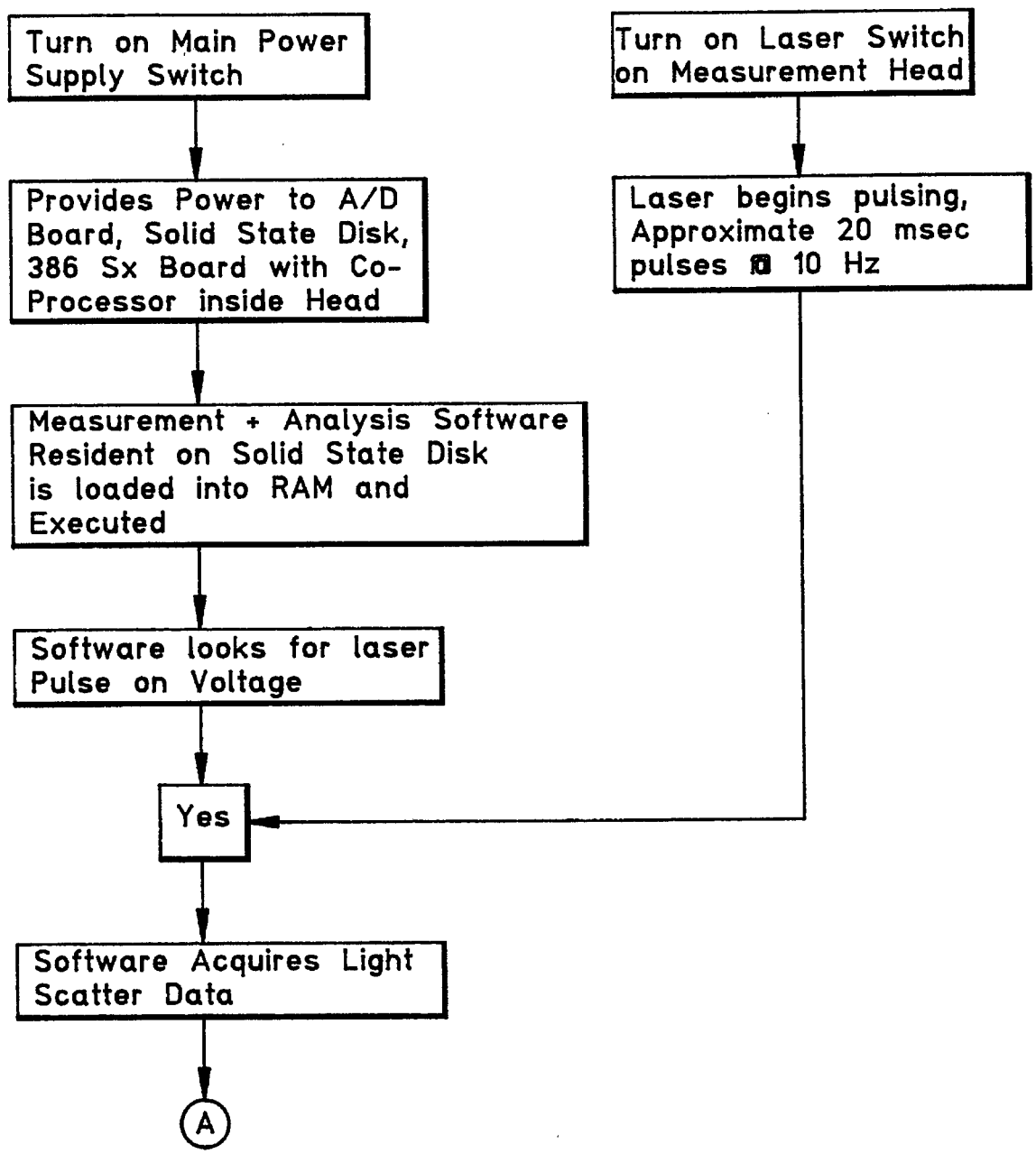
FIGS. 8A and 8B is a flow diagram illustrating initiating the operation of the system.
Figure 8B:
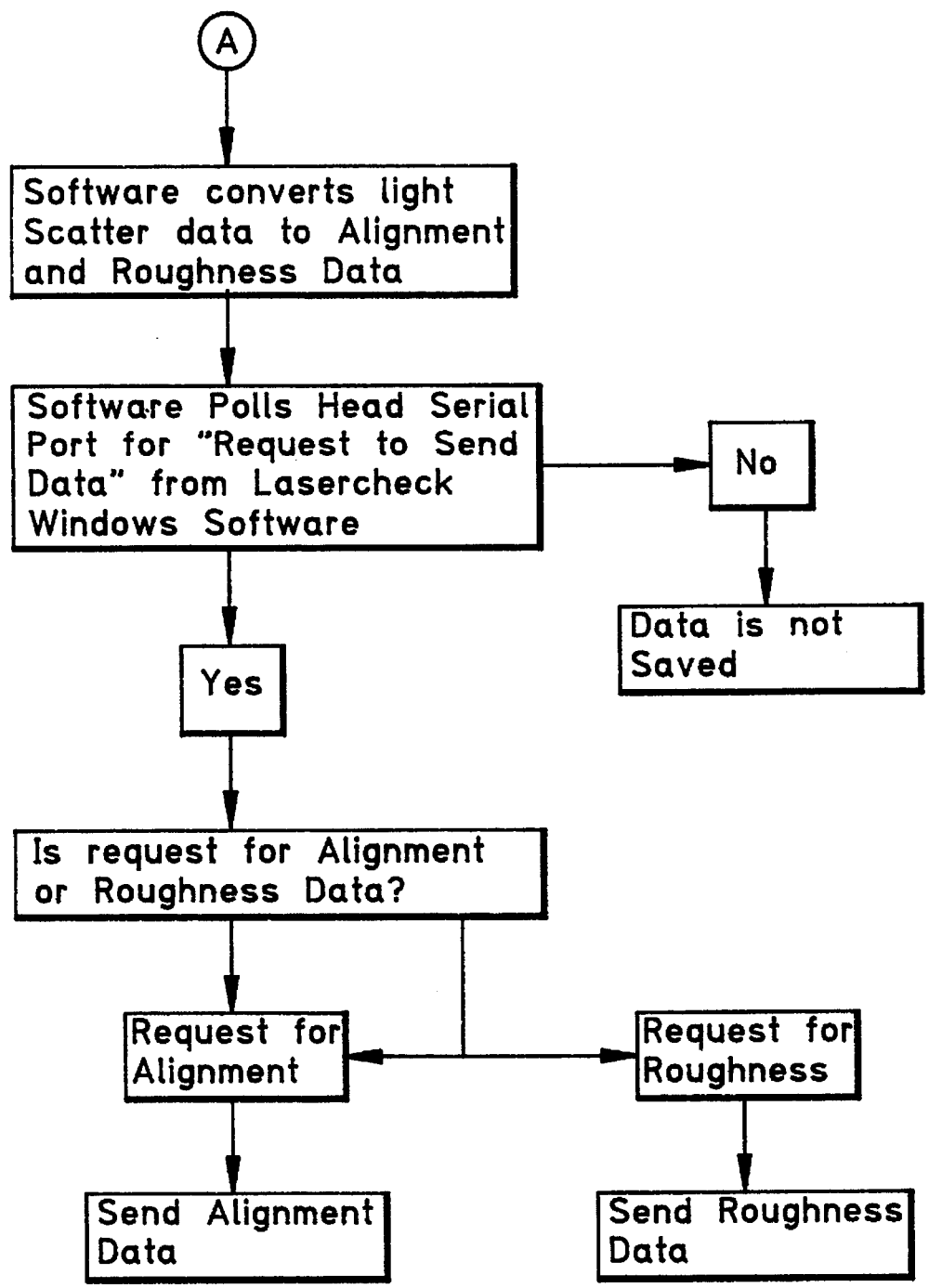

Referring to FIGS. 8a and 8b, a flow diagram of initial powering of the system is illustrated. Turning on the main power switch 68 (FIG. 1) provides power to the system activating the CPU 40 (FIG. 3) and loading of the measurement analysis software into the RAM 50 (FIG. 3) and executing it. The system then begins to look to laser pulse voltage and if the laser switch 70 (FIG. 1) is on, the laser begins pulsing and provides a signal. The system begins to acquire light scatter data which is converted to alignment and roughness data to the host computer 54 (FIG. 3) if requested. On request, alternately alignment and/or roughness data are sent to the host computer.

Figure 9A:
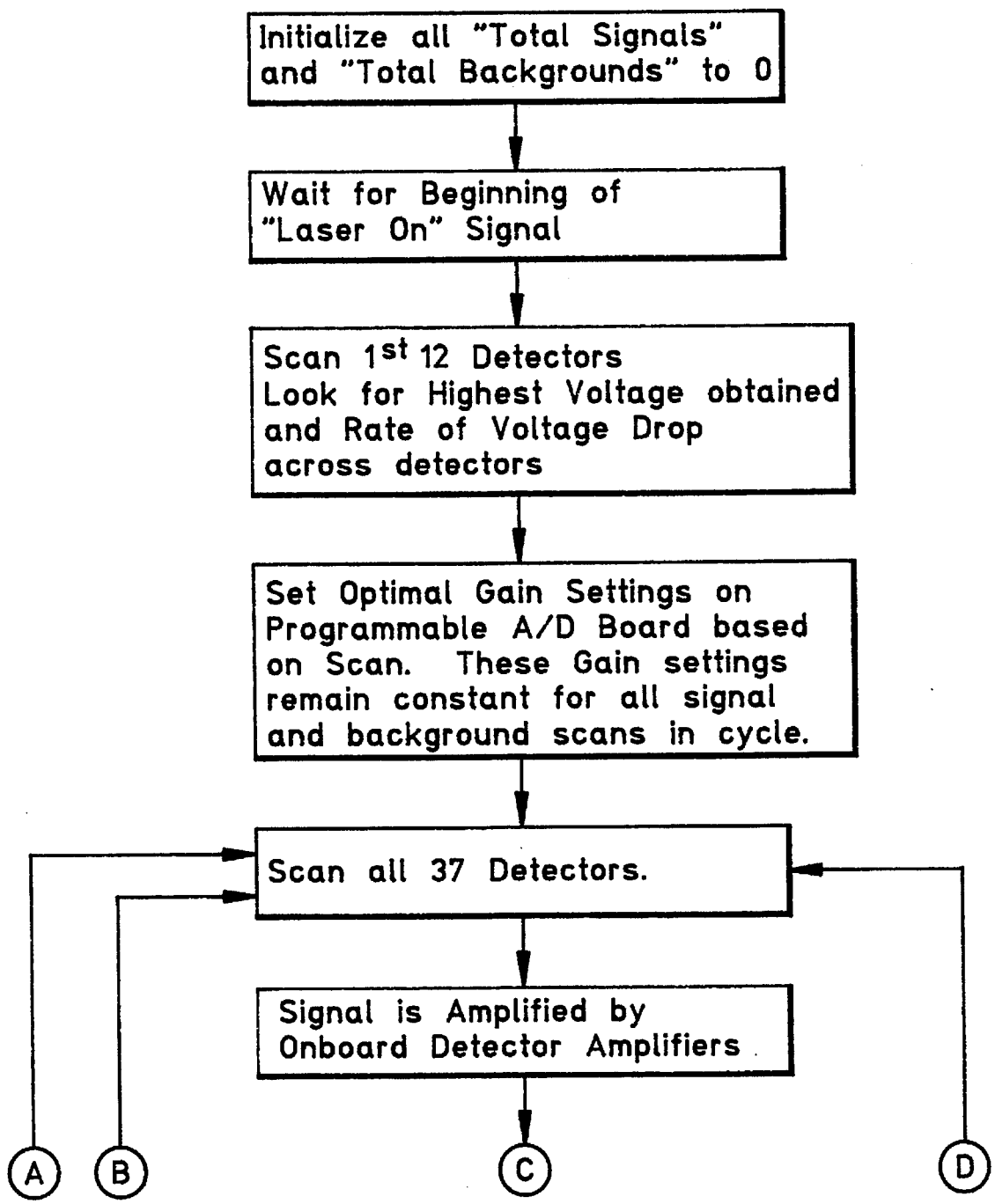
FIGS. 9A–9C is a flow diagram illustrating the operation of the system in acquiring light scatter data.
Figure 9B:
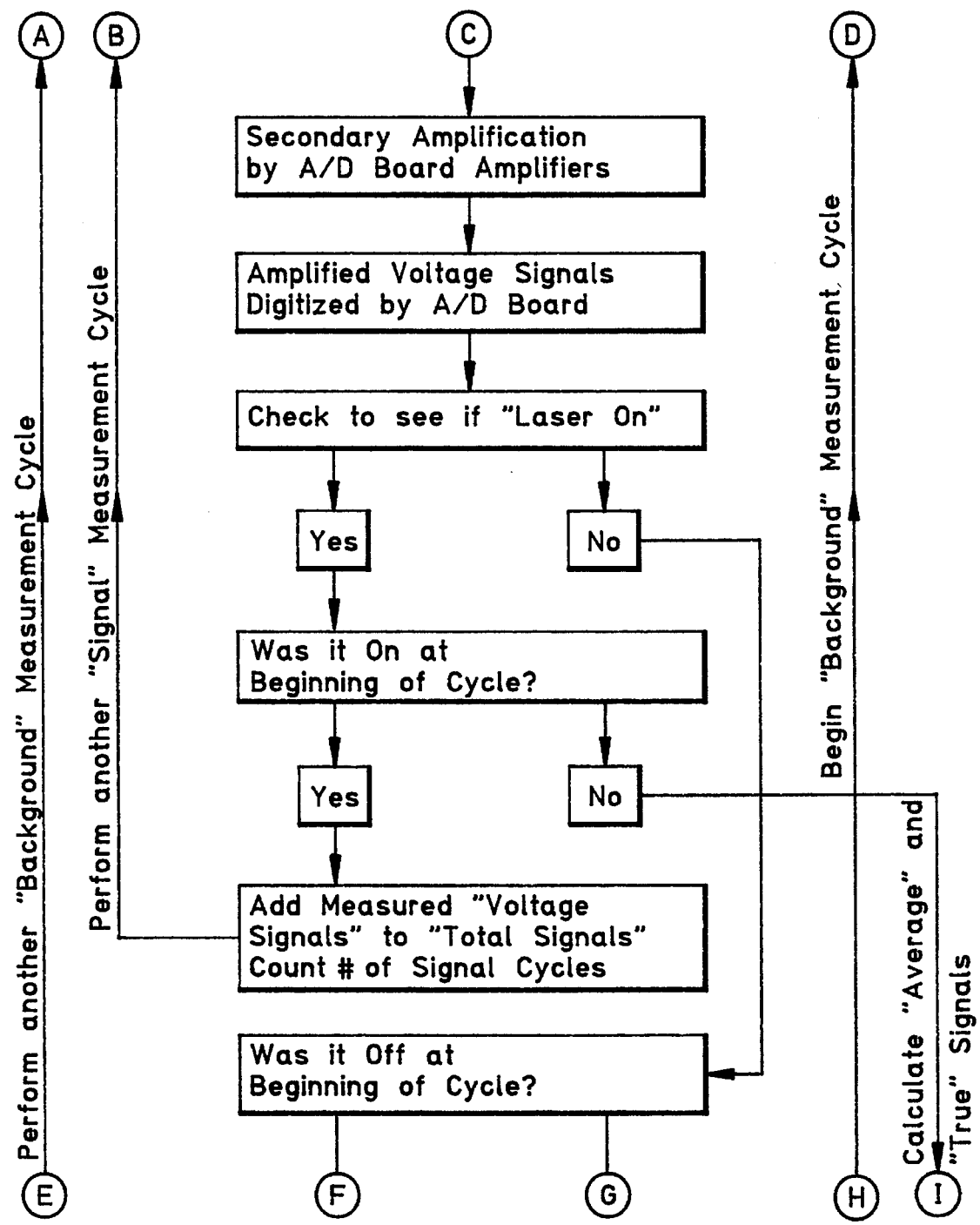
Figure 9C:
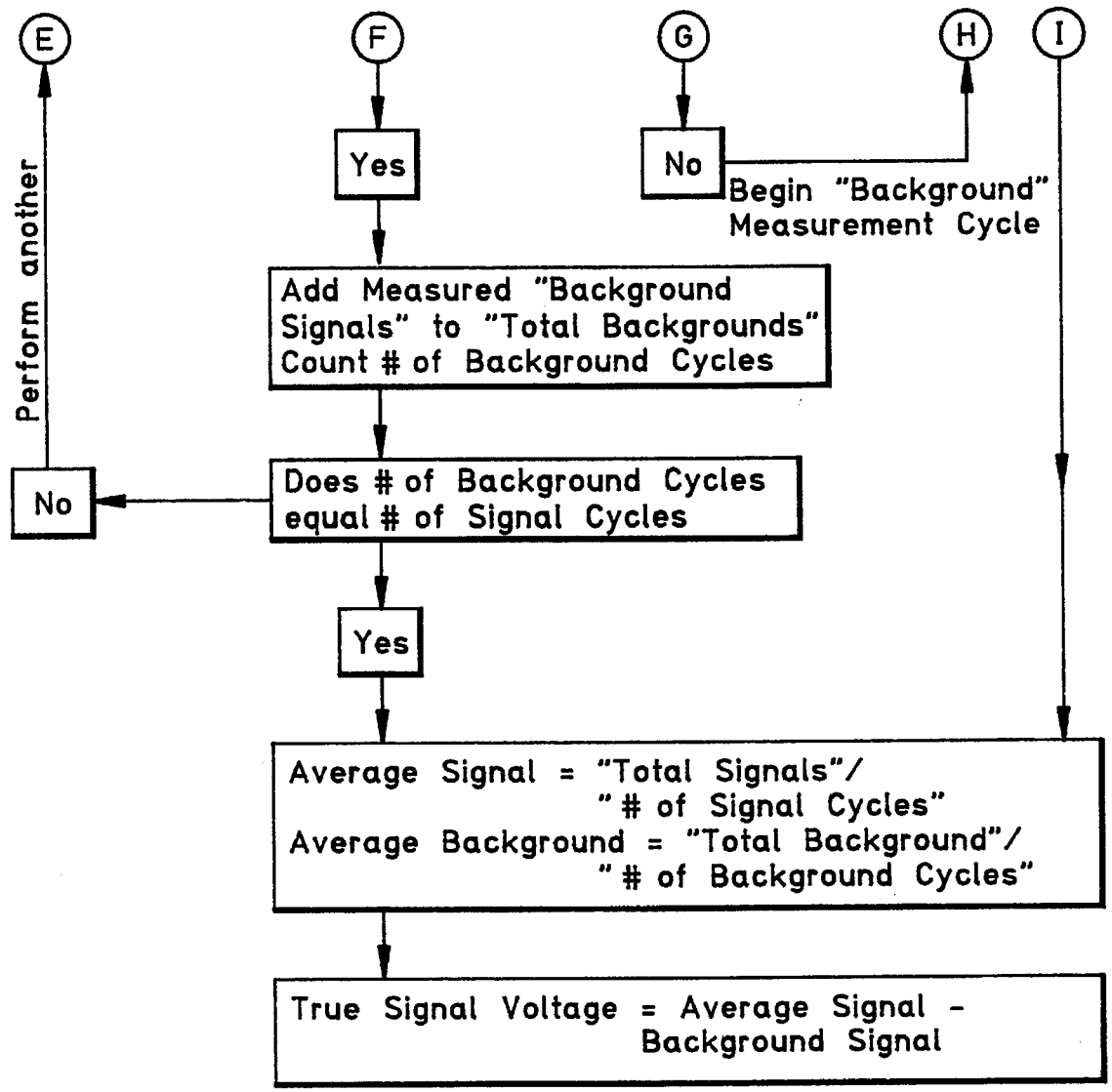

Referring to FIGS. 9a through 9c, a flow diagram of the system in acquiring light scatter data is illustrated. The system goes through a routine, as illustrated, to initialize total signals and all total backgrounds to 0. The system first scans the first twelve detectors looking for the highest voltage obtained which represents the specular beam. Based on this scan, gain settings are set to an optimal and remain at that optimal setting for all signal and background scans in a cycle. The system then scans all thirty-seven detectors and amplifies the signals. It then checks at the end of the scan to see if the laser is still on. If the laser was on, the measured voltage signals are added to the total signals for the number of signal cycles and another signal measurement cycle is performed. If the laser is off, background measurement scans are performed. Measured background signals are added to the total background signals. If the background cycle count number does not equal signal cycle count number, then another background measuring cycle is conducted. These total signals are then averaged for total number of signal cycles and total background signals for the number of background cycles. A true signal voltage then equals average voltage signal minus the average background signal.

Referring to FIGS. 10a through 10d, a flow diagram illustrating the system routine for calculating roughness and standoff alignment data is illustrated. As illustrated in this flow diagram, the system determines the specular detector number, then calculates angles of all detectors with respect to surface normal. The system then proceeds with calculating the light collection angle width of each detector and provides an angle corrected voltage which equals the true signal voltage divided by the width. The system then cosine corrects scatter which equals angle corrected voltage divided by cosine of the scatter angle and then rechecks specular detector using cosine corrected values.

The system determines for each cycle whether the specular detector has changed. If yes, then the system recalculates all of the above factors. If no, then it calculates gauge standoff. The routine for calculating gauge standoff is illustrated in FIG. 17. If specular detector is greater than ten, or is equal to one, then the specular region for that measurement cycle is invalid. The system then performs a new measurement cycle and recalculates the above collection angles for determining the specular detector. Adjustment of standoff may be necessary if several measurements and calculations in sequence reveal the specular region to be invalid.

Figure 10A:
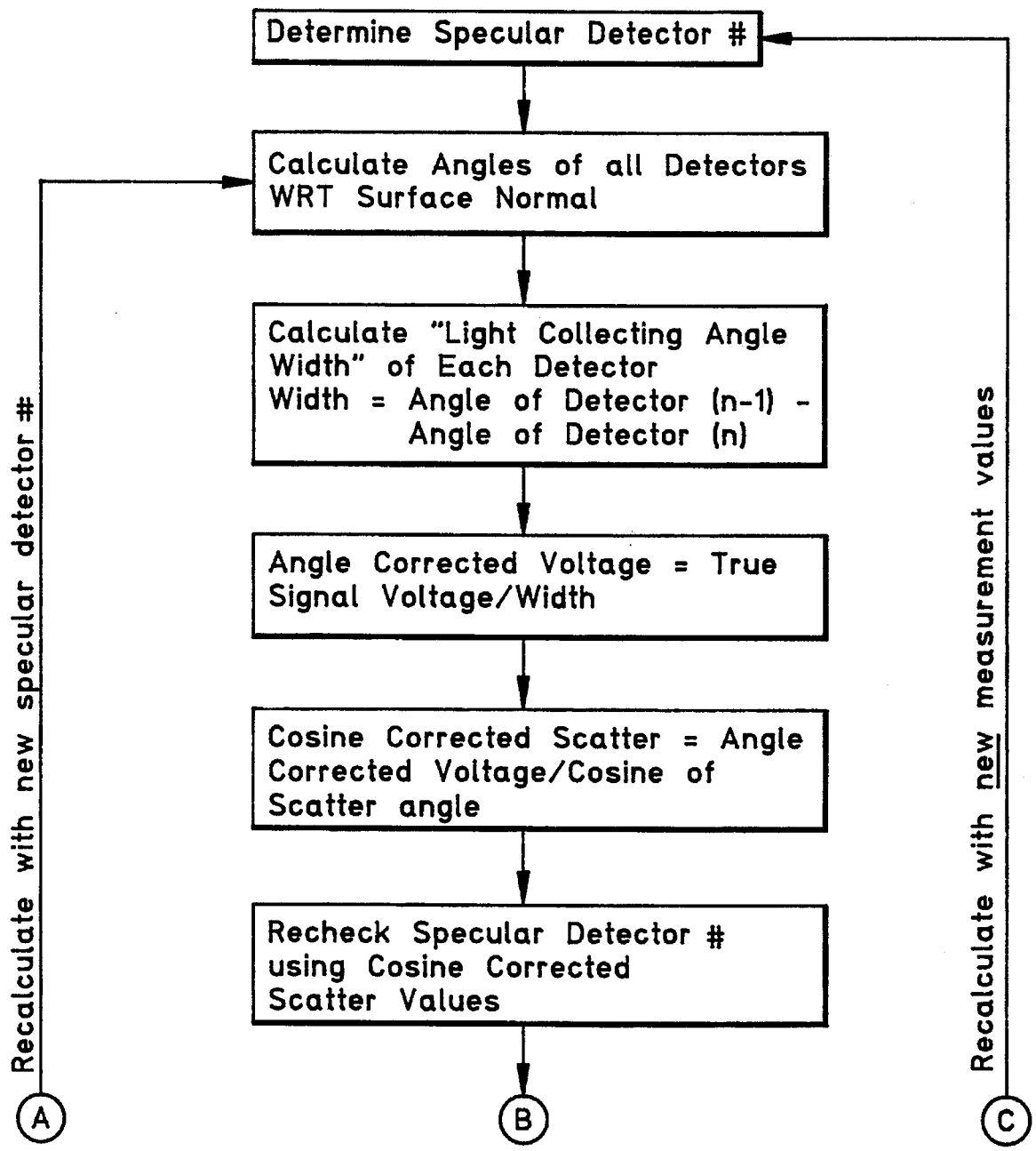
FIGS. 10A–10D is a flow diagram illustrating the operation of the system in calculating standoff alignment and roughness.
Figure 10B:
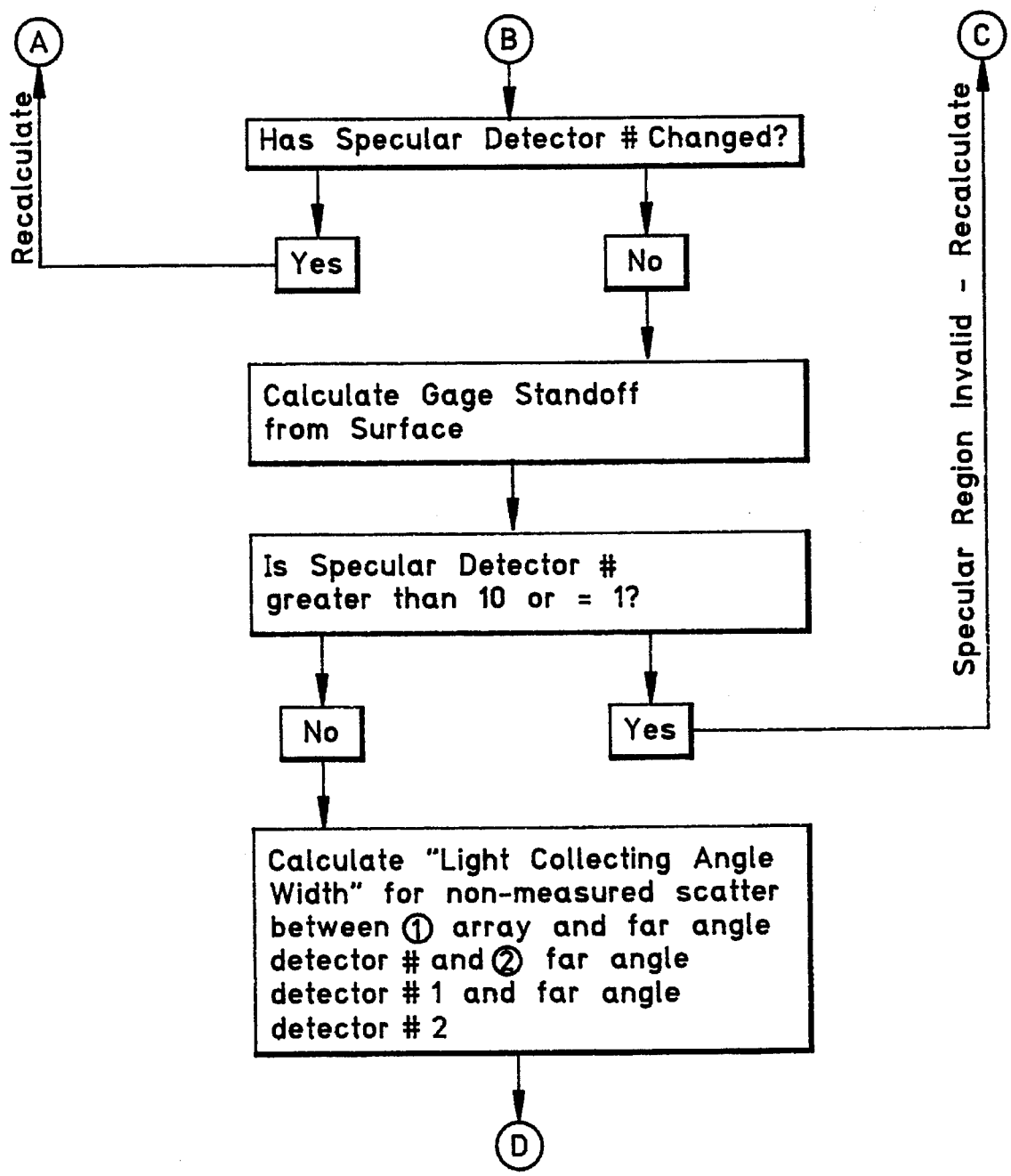
Figure 10C:
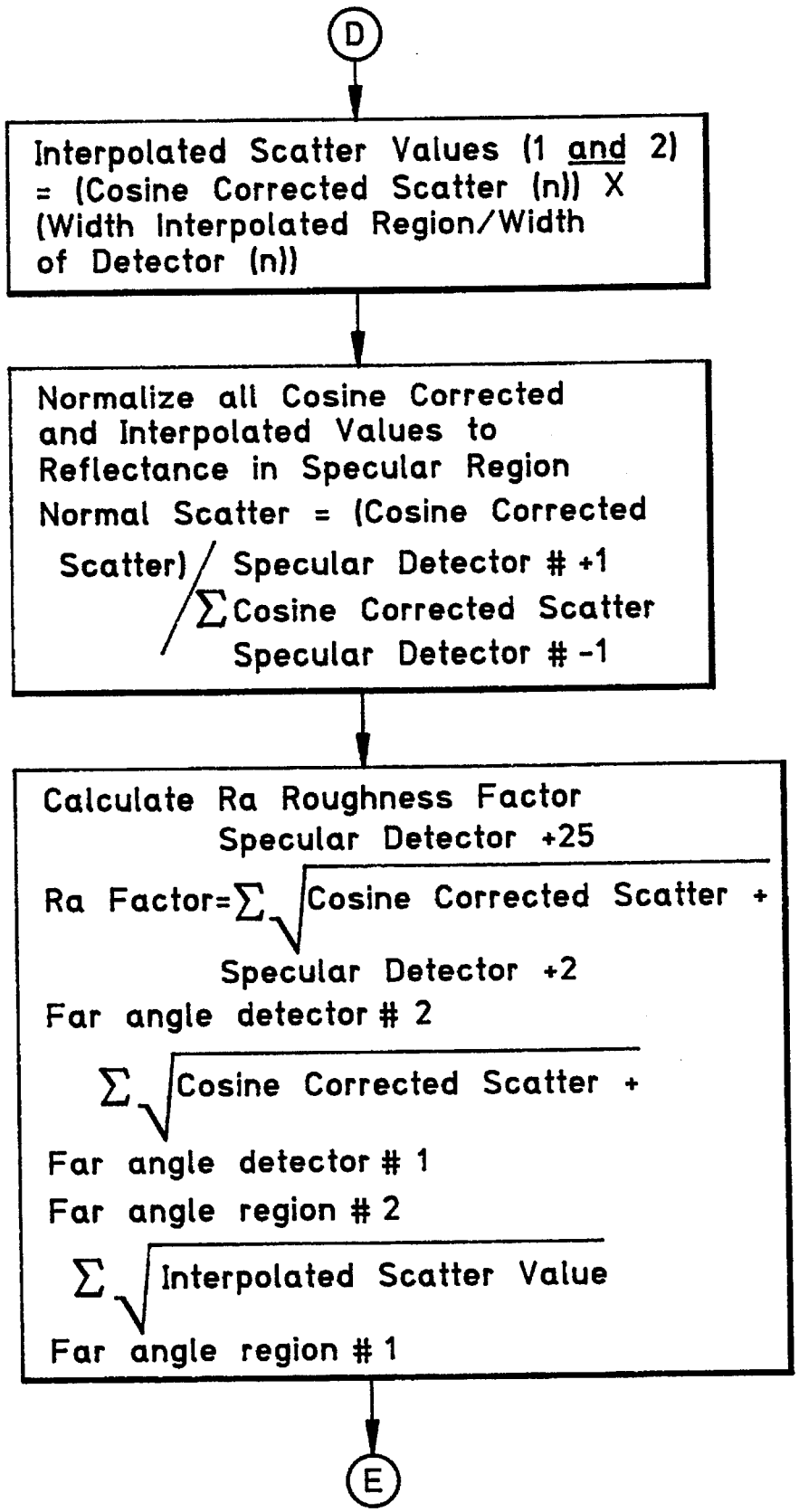

If the specular detector is in a proper location then the system calculates light collection angle width for non-measured scatter between (1) array and far angle detector 26; and (2) and far angle detector 26 and far angle detector 28. The interpolated scatter values for (1) and (2) equal the cosine corrected scatter times width of the interpolated region divided by width of detector (n). The system then normalizes all cosine corrected and interpolated scatter values to the reflectance values measured in the specular region (FIG. 10c). The normalization routine yields identical scatter vs. angle curves for surfaces with identical roughness that are different color and overall reflectivity (a black, white, green or silver all look the same with the same roughness).

Figure 10D:
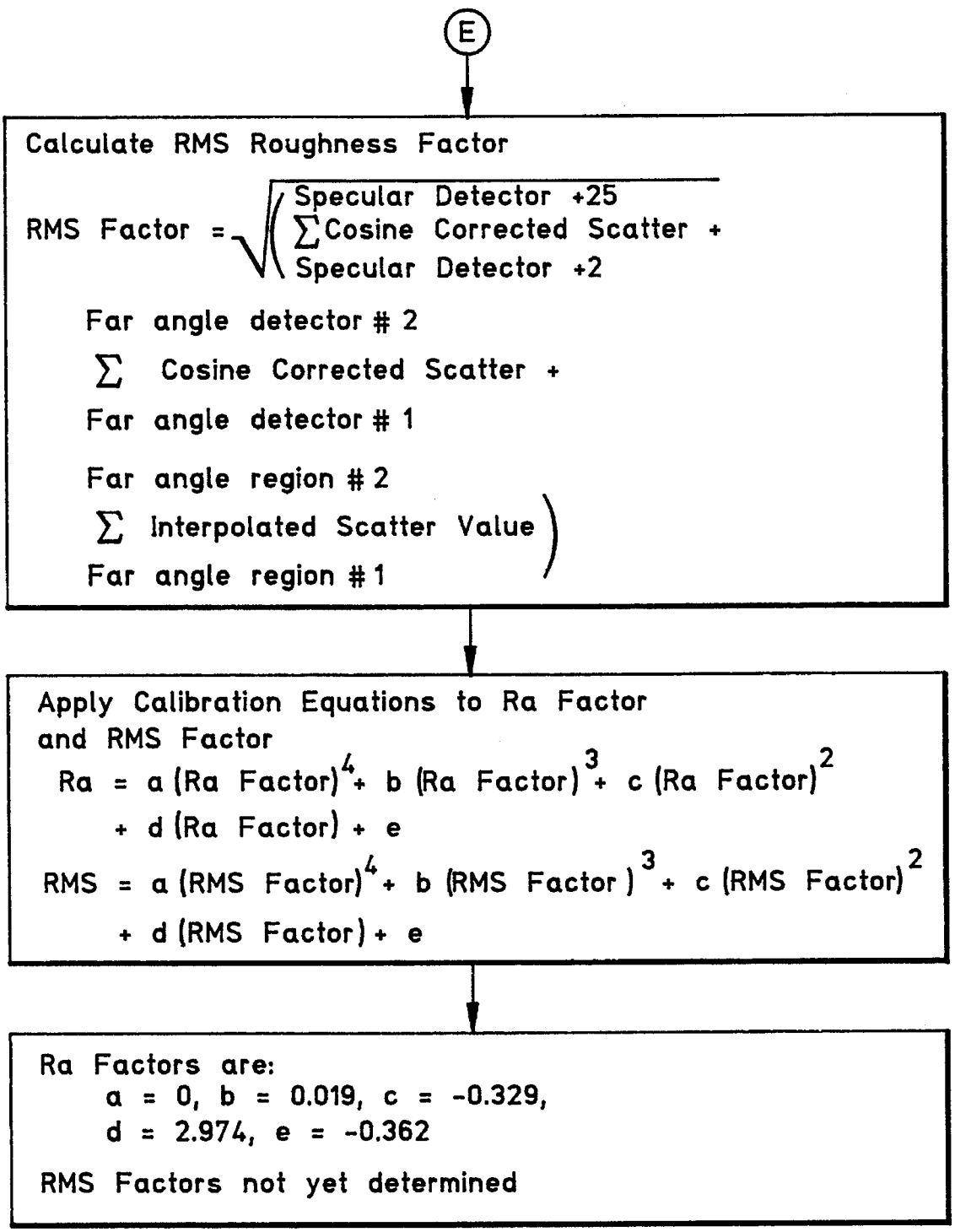

The system then calculates Ra roughness factor and RMS roughness factor as illustrated in FIGS. 10c and 10d. The RMS roughness factor equals the square root of the sum of the scatter voltages divided by the specular voltage. The Ra roughness factor equals the sum of the square root of the scatter voltages divided by the specular voltage. The system then applies calibration equations to the Ra factor and the RMS factor.

Calibration can be carried out by measuring multiple samples of known varying roughness by the same process to determine roughness factors for the samples by that same process. The same process refers to just "turned" surface, "ground" surface, or "polished" surface. Two matrices are then created of known roughness and roughness factor.

Figure 11:
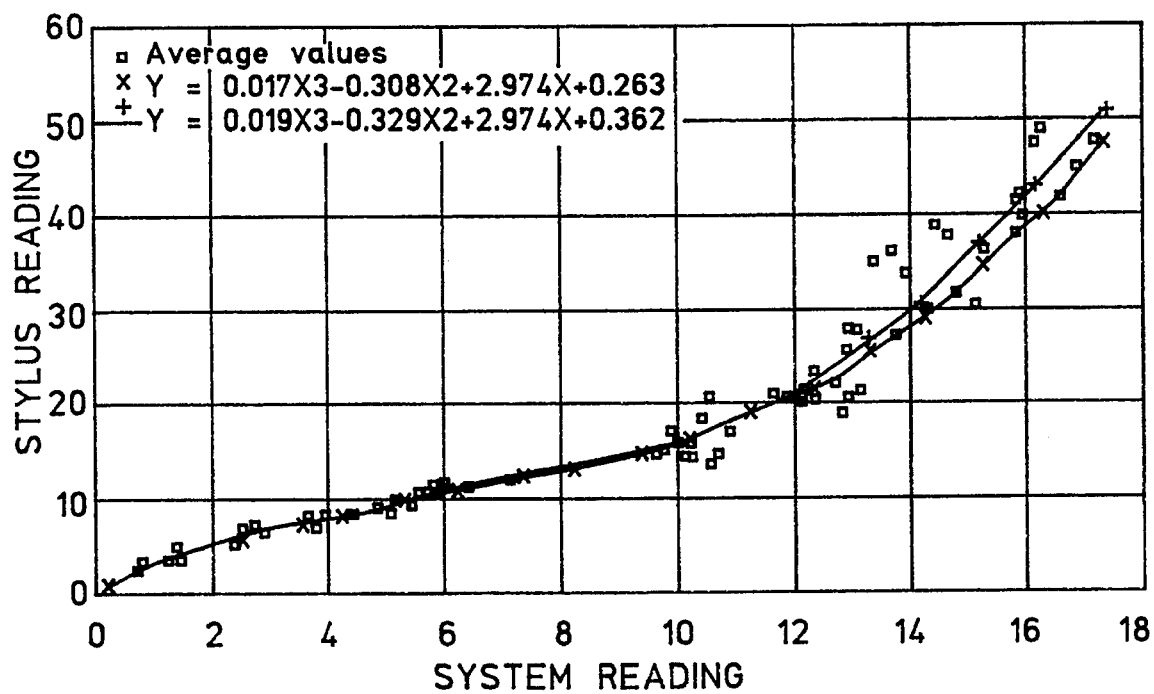
FIG. 11 is a plot diagram of known roughness vs. roughness factor according to the invention.

Regression analysis is then used to determine the polynomial equation best describing relationship between known roughness and a roughness factor. These are typically third and fourth order equations. These calibration curves as shown in FIG. 11 are used for subsequent measurements to determine final roughness figures. The curve is plotted with values from a stylus measurement and roughness factor values obtained by the system.

Figure 12:
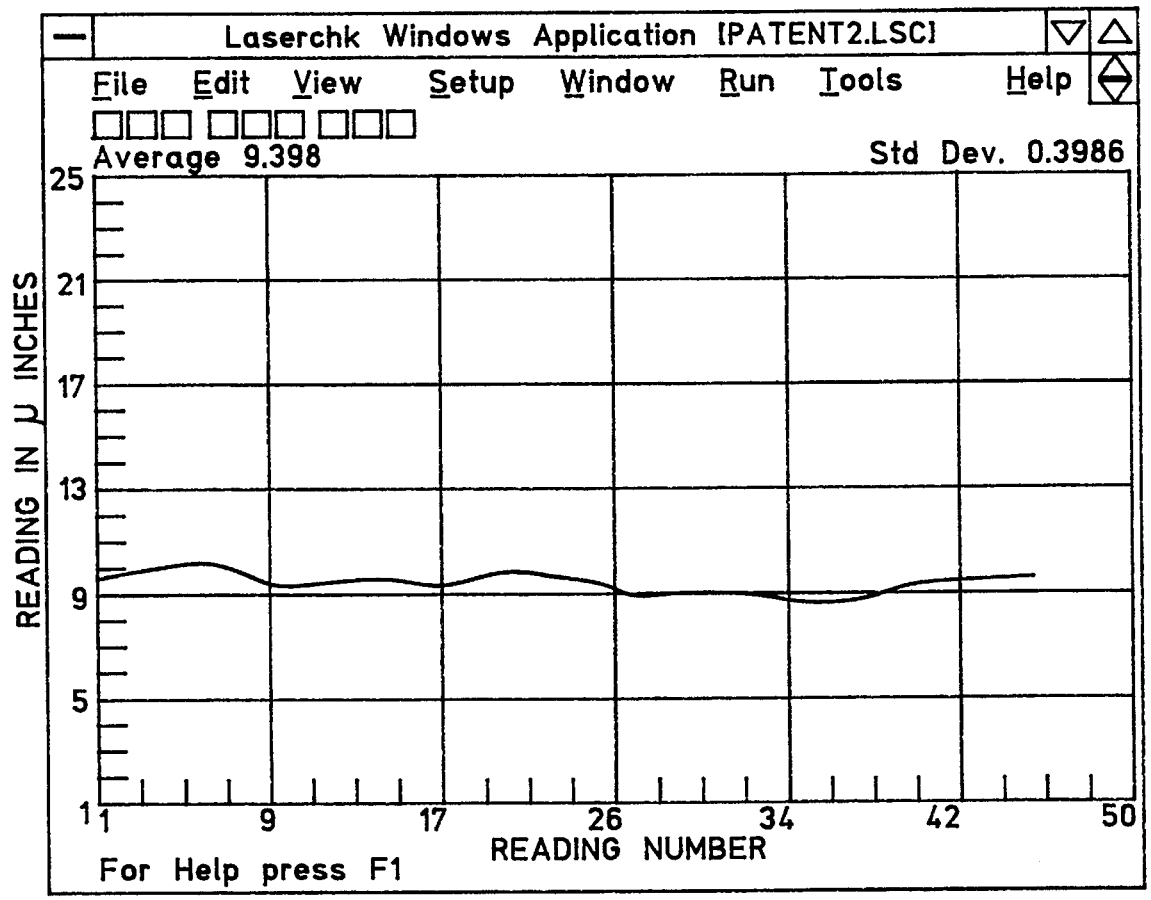
FIG. 12 is a computer screen display for a surface measurement.

The results of the measurement for a given work piece can then be displayed on the host user screen as a roughness number, such as illustrated in FIG. 12, for example. As shown in FIG. 12, measurement results for rolled sheet aluminum is illustrated showing a plot of average roughness, and digital display of average roughness and standard deviation. The user is given various options to save, cancel or print the data generated.

Figure 13:
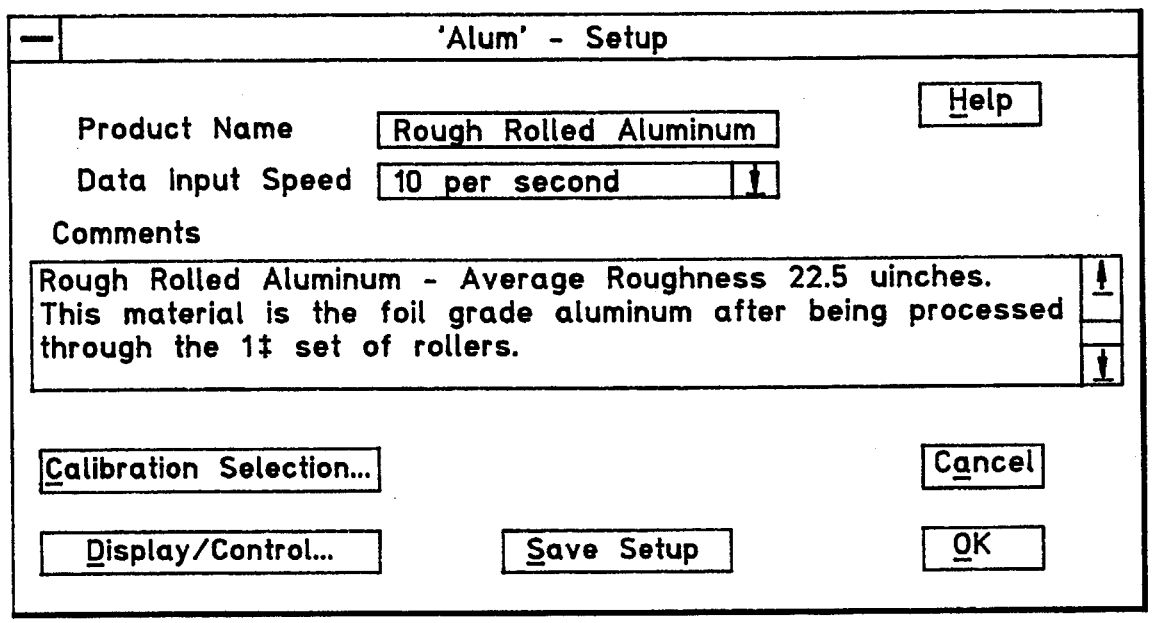
FIG. 13 is a computer screen display showing user set-up options.
Figure 14:
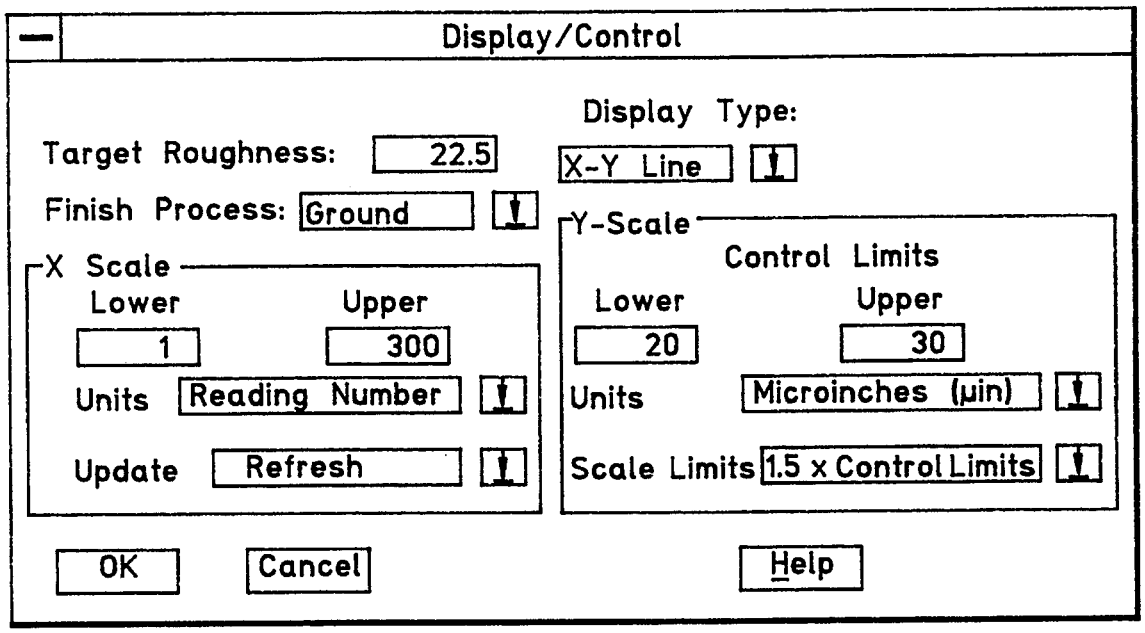
FIG. 14 is a computer screen display showing graphic display options.

The user is provided options for customizing the set-ups and display as illustrated in FIG. 13 and FIG. 14. FIG. 13 provides for comments relating to the material or work piece being inspected giving average roughness and other factors. Other control options are displayed, such as illustrated for example, in FIG. 14.

Figure 15:
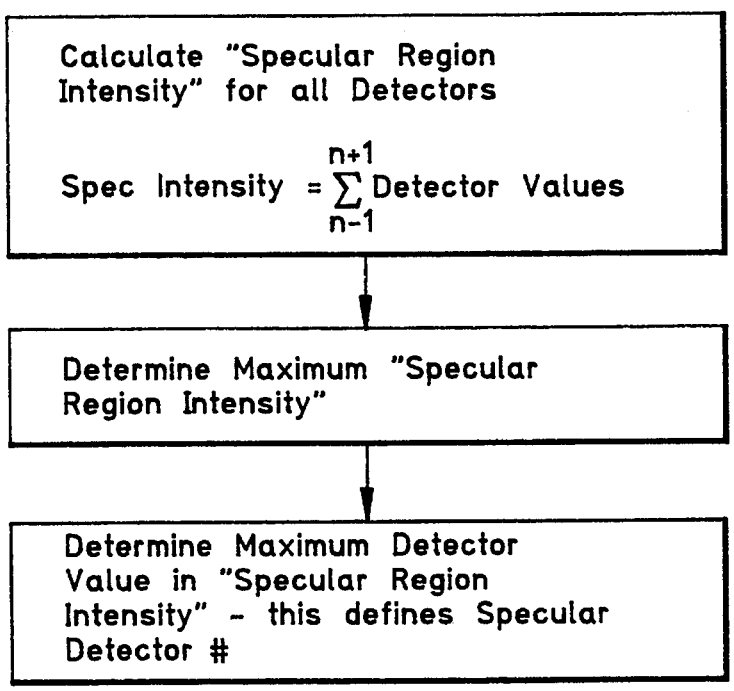
FIG. 15 is a flow diagram illustrating the operation of the system in determining the specular detector number.

Referring to FIG. 15, a flow diagram for determining the specular detector number is illustrated. The system scans the array detectors in groups of three and calculates specular region intensity for all detectors and sums all of these detector values and determines the maximum specular region intensity. The system then determines maximum detector value in the specular region intensity which defines the specular detector number. The specular region may involve a larger block of detectors, for example, it may involve N−2 to N+2 or N−3 to N+3.

Figure 16:
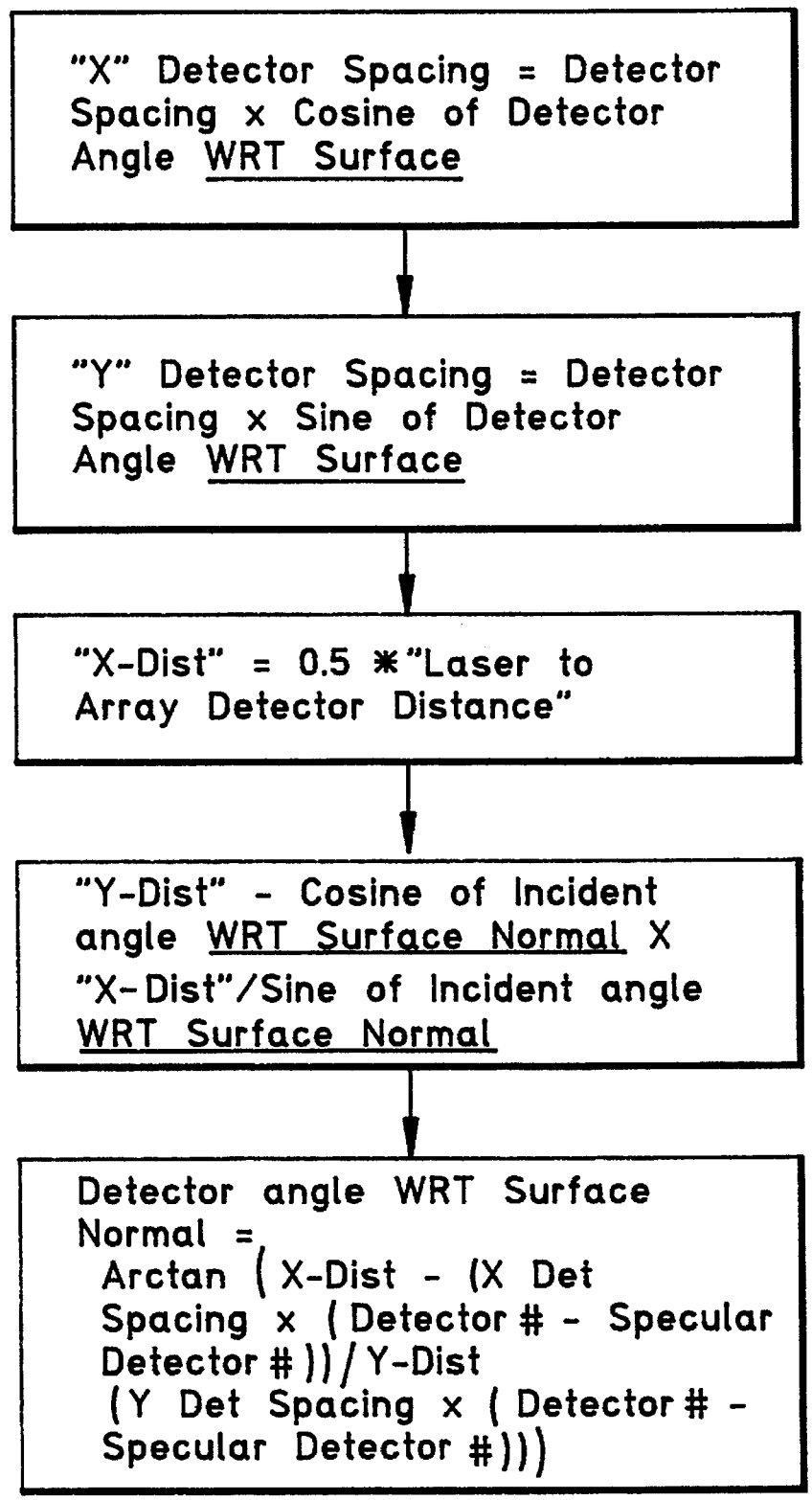
FIG. 16 is a flow diagram illustrating the operation of the system in determining the angles of all detectors with respect to surface normal.

Referring to FIG. 16, a flow diagram of the routine to calculate angles of all the detectors with respect to surface normal is illustrated. The X-value of detector spacing equals the detector spacing times the cosine of detector angle with respect to the surface. Y detector spacing equals detector spacing times the sine of detector angle with respect to surface. The X-distance of the illuminated spot to the far edge of the detector array equals 0.5 times the laser to detector array distance. The Y-distance of the illuminated spot to the bottom of the detector array equals the cosine of the incident angle with respect to surface normal times the X-distance divided by the sine of the incident angle with respect to surface normal.

Referring to FIG. 17, a flow diagram of the routine to calculate or determine gauge standoff from the work surface is illustrated for the disclosed embodiment geometry calculations provide the parameters for a preferred standoff to place the specular beam within the first ten segments.

While I have illustrated and described my invention by means of specific embodiments with specific illustrations, it is to be understood that numerous changes and modifications may be made therein without departing from the spirit and scope of the invention as defined in the appended claims.

We claim:

1. An apparatus for non-contact measuring of surface roughness, comprising:

a source of light positioned for directing a light beam at a first angle onto a surface to be measured;

first detector means including a multi-element array detector, said array detector having an intermediate element and at least two adjacent elements, one positioned on each side of said intermediate element, said array detector positioned to receive specular light reflected from said surface by said intermediate element and to receive scattered light by said adjacent elements, said intermediate element responsive to generate a signal in response to said specular light, and said adjacent elements each responsive to generate a signal in response to said scattered light;

second detector means including a detector spaced from said first detector means and at an angle from about fifteen to about sixty-five degrees from specular center, said detector responsive to scattered light away from said specular light for generating a signal responsive to said scattered light; and means for receiving and processing said signals and displaying a reading corresponding to surface roughness.

2. The measuring apparatus of claim 1 wherein said multi-element array detector is positioned at an angle to the axis of said reflected light to direct non-absorbed reflected light away from said surface.

3. The measuring apparatus of claim 1 wherein:

said second detector means is disposed at an angle of about thirty-five degrees from specular center; and further comprising third detector means disposed at about sixty-five degrees from specular center.

4. The measuring apparatus of claim 1 wherein said multi-element array detector is a linear array aligned in the plane of said beam.

5. The measuring apparatus of claim 4 wherein said multi-element array detector is segmented.

6. The measuring apparatus of claim 5 wherein said multi-element array detector has approximately 35 segments.

7. The measuring apparatus of claim 5 wherein said multi-element array segments are each about one mm in length.

8. The measuring apparatus of claim 5 wherein said light source and said multi-element array are positioned so that said light beam has an angle of incidence of about seventy-five degrees with respect to surface normal.

9. An apparatus for non-contact measuring of surface roughness, comprising:

a source of light positioned for directing a light beam at a first angle onto a surface to be measured;

first detector means including a segmented multi-element array detector positioned to receive specular light reflected from said surface by an intermediate segment and to receive scattered light by adjacent segments, said intermediate segment responsive to generate a signal in response to said specular light, and said adjacent segments each responsive to generate a signal in response to said scattered light, said light source and said multi-element array are positioned so that the specular beam is received by said array within the first twelve elements of said array;

second detector means including a second detector spaced from said first detector means and at an angle of about thirty-five degrees from specular center, said second detector means responsive to scattered light away from said specular light for generating a signal responsive to said scattered light; and means for receiving said signals and displaying a reading corresponding to surface roughness.

10. An apparatus for non-contact measuring of surface roughness, comprising:

a source of light positioned for directing a light beam at a first angle onto a surface to be measured;

first detector means including a segmented multi-element array detector positioned to receive specular light reflected from said surface by an intermediate segment and to receive scattered light by adjacent segments, said intermediate segment responsive to generate a signal in response to said specular light, and said adjacent segments each responsive to generate a signal in response to said scattered light, said light source and said multi-element array are positioned so that the specular beam is received by said array within the first and tenth element and has an angle of incidence of about seventy-five degrees with respect to surface normal;

second detector means including a second detector spaced from said first detector means and at an angle of about thirty-five degrees from specular center, said second detector responsive to scattered light away from said specular light for generating a signal responsive to said scattered light; and means for receiving said signals and displaying a reading corresponding to surface roughness.

11. The measuring apparatus of claim 5 wherein said light source and said multi-element array are positioned so that the angles of incident and reflection are each about seventy-five degrees respectively, with respect to surface normal.

12. The measuring apparatus of claim 5 wherein said means for receiving said signals and displaying a reading comprises an analog to digital converter and a CPU.

13. A surface roughness measuring apparatus for non-contact measuring of the roughness of a surface, comprising:

a laser positioned for directing a light beam at a selected incident angle on a surface to be measured;

first detector means comprising multi-element linear array detector positioned at a first angle to receive a specular light beam from said surface by an intermediate element and generating a first signal, and for receiving scatter rays by at least two adjacent elements and generating a second signal, said array detector positioned at a reflection angle to the axis of said specular light beam to direct light not absorbed by said detector away from said surface;

second detector means spaced at a second angle from said axis of said specular light beam for receiving scatter rays away from said specular beam and generating a third signal in response thereto;

third detector means spaced at a third angle from said axis of said specular light beam for receiving scatter rays away from said specular beam and generating a fourth signal thereto; and means responsive to said first, said second, said third and said fourth signals for initiating a display indicative of the roughness of said surface.

14. The measuring apparatus of claim 13 wherein:

said first angle is about seventy five degrees;

said second detector means is disposed at an angle of about thirty-five degrees from said axis of said specular beam;

said third detector means is disposed at about sixty-five degrees from said axis of said specular beam; and said source of light is a laser.

15. The measuring apparatus of claim 1 wherein said means for receiving said signals includes means for compensating for changes in distance of said light source from said surface.

16. The measuring apparatus of claim 14 wherein said means for receiving said signals includes means for compensating for differences in color and reflectivity of said surface.

17. The measuring apparatus of claim 13 wherein:

said multi-element array detector has approximately 35 segments; and said light source and said multi-element array are positioned so that the specular beam is received by said array within the first twelve elements of said array.

18. The measuring apparatus of claim 17 wherein said multi-element array segments are each about one mm in length.

19. A method for non-contact measuring of surface roughness, comprising:

directing a light beam from a source of light at a first angle onto a surface to be measured;

receiving specular light of said beam at first detector means including a segmented multi-element array detector positioned to receive specular light reflected from said surface by an intermediate segment and to receive scattered light by adjacent segments, said intermediate segment responsive to generate a signal in response to said specular light, and said adjacent segments each responsive to generate a signal in response to said scattered light;

receiving scattered light by second detector means including a detector spaced from said first detector means and at an angle of at least five degrees more from surface than said first angle, said detector responsive to scattered light away from said specular light for generating a signal responsive to said scattered light; and processing said signals and displaying a reading corresponding to surface roughness.

20. The method of claim 19 wherein said step of processing said signals includes dividing said second and third signals by the first signal and then calculating the square root of the sum of the second and third signals and thereby provide an RMS roughness factor.

21. The method of claim 19 wherein said step of processing said signals includes dividing said second and third signals by the first signal and then calculating the square root of these second and third signals and then summing these square roots and thereby providing an Ra roughness factor.

22. The method of claim 21 wherein the step of processing said signals comprises cosine correcting said signals.

23. The method of claim 19 wherein step of processing said signals comprises the steps of:

dividing all said scattered light signals by said specular light signal;

summarizing all signals responsive to said scattered light; and taking the square root of the sum of said signals to yield an RMS roughness factor.

24. The method of claim 19 wherein the step of converting said roughness factors to a roughness reading includes calibrating said roughness factors to correspond to a standard roughness value.

25. The method of claim 19 wherein said step of processing said signals comprises processing said signals in a programmed CPU.

26. The method of claim 25 wherein said step of processing said signals includes dividing said second and third signals by the first signal and then calculating the square root of the sum of these second and third signals and thereby provide an RMS roughness factor.

27. The method of claim 25 wherein step of processing said signals comprises the steps of:

dividing all said scattered light signals by said specular light signal;

taking the square roots of said signals; and summarizing all square roots to yield an Ra roughness factor.

28. The method of claim 27 wherein the step of converting said signals to a roughness reading includes calibrating said signals to correspond to a standard roughness value.

29. The method of claim 25 wherein step of processing said signals comprises the steps of:

dividing all said scattered light signals by said specular light signal;

summarizing all signals responsive to said scattered light; and taking the square root of the sum of said signals to yield an RMS roughness factor.

30. The method of claim 29 wherein the step of processing said signals comprises cosine correcting said signals.

31. The method of claim 29 wherein the step of processing said signals comprises detector angle width correcting said signals.

32. The measuring apparatus of claim 13 wherein said means for receiving said signals includes means for compensating for changes in distance of said light source from said surface.

* * * * *